(12) United States Patent
Jerger et al.

(10) Patent No.: US 11,296,636 B2
(45) Date of Patent: Apr. 5, 2022

(54) METHOD FOR OPERATING AN ELECTRICALLY COMMUTATED MACHINE

(71) Applicant: Robert Bosch GmbH, Stuttgart (DE)

(72) Inventors: Armin Jerger, Sinzheim (DE); David Fricker, Oberhoffen sur Moder (FR); Dominik Denz, Buehl (DE); Johannes Rehagen, Karlsruhe (DE); Michael Soellner, Lichtenau (DE); Tankred Mueller, Hamburg (DE); Thomas Malich, Kappelrodeck (DE); Ulrich Vollmer, Weilheim (DE)

(73) Assignee: Robert Bosch GmbH, Stuttgart (DE)

(*) Notice: Subject to any disclaimer, the term of this patent is extended or adjusted under 35 U.S.C. 154(b) by 113 days.

(21) Appl. No.: 16/512,529

(22) Filed: Jul. 16, 2019

(65) Prior Publication Data
US 2021/0021222 A1 Jan. 21, 2021

(30) Foreign Application Priority Data
Jul. 16, 2018 (DE) .................... 10 2018 211 771.3

(51) Int. Cl.
*H02P 23/00* (2016.01)
*H02P 23/14* (2006.01)
*H02P 21/00* (2016.01)

(52) U.S. Cl.
CPC ...... *H02P 23/0022* (2013.01); *H02P 21/0089* (2013.01); *H02P 23/14* (2013.01)

(58) Field of Classification Search
CPC ........ H02P 6/153; H02P 25/10; H02P 25/107; H02P 23/0022; H02P 23/14; H02P 6/15; H02P 21/0089
See application file for complete search history.

(56) References Cited

U.S. PATENT DOCUMENTS

| 6,995,679 | B2* | 2/2006 | Eskritt | ............... B62D 5/065 340/686.1 |
| 7,145,303 | B2* | 12/2006 | Lelkes | ................. H02P 6/15 318/400.09 |
| 7,157,870 | B2* | 1/2007 | Nakagawa | ........ H02P 23/0004 318/400.01 |

(Continued)

FOREIGN PATENT DOCUMENTS

| DE | 102011080941 A1 | 2/2013 |
| DE | 102015213565 A1 | 1/2017 |
| DE | 102015224726 A1 | 6/2017 |

OTHER PUBLICATIONS

Peter Bober, Measurement of BLDC Motor Efficiency for Commutation Angle Optimisation, DOI: 10.26649/musci.2015.052 (Year: 2015).*

(Continued)

*Primary Examiner* — Bickey Dhakal
(74) *Attorney, Agent, or Firm* — Michael Best & Friedrich LLP (57) ABSTRACT

A method for operating an electrically commutated machine. In at least one method step, in particular in at least one method step of overmodulation operation of the electrically commutated machine, a precommutation angle of the electrically commutated machine is set depending on an efficiency of the electrically commutated machine.

15 Claims, 5 Drawing Sheets

(56) References Cited

U.S. PATENT DOCUMENTS

| | | | |
|---|---|---|---|
| 2004/0145330 A1* | 7/2004 | Maslov | H02P 6/15 |
| | | | 318/437 |
| 2009/0146589 A1* | 6/2009 | Hattori | B60L 15/20 |
| | | | 318/400.02 |
| 2010/0213883 A1 | 8/2010 | Horng et al. | |
| 2014/0300299 A1* | 10/2014 | Heise | H02P 6/153 |
| | | | 318/400.05 |
| 2017/0040922 A1* | 2/2017 | Fujishima | H02P 27/08 |
| 2017/0163181 A1* | 6/2017 | Namuduri | H02P 27/08 |
| 2018/0159456 A1* | 6/2018 | Kato | H02P 6/153 |
| 2020/0366230 A1* | 11/2020 | Iwai | H02P 25/092 |

OTHER PUBLICATIONS

Lelkes A et al: "BLOC motor for fan application with automatically optimized commutation angle", Power Electonics Specialists Conference, 2004. PESC 04. 2004 IEEE 35th Annual, Aachen, Germany Jun. 20-25, 2004, Poscatawy, NJ, USA, IEE.

Peter Bober: "Measurement of Objective Function for BLOC Motor Optimization", Acta Electronica et Informatica, Bd 17, Nr. 4, Dec. 1, 2017 (Dec. 1, 2017), Seiten 43-49.

* cited by examiner

METHOD FOR OPERATING AN ELECTRICALLY COMMUTATED MACHINE

BACKGROUND OF THE INVENTION

A method for operating an electrically commutated machine has already been proposed in which a phase shift of a voltage applied to a stator of the electrically commutated machine with respect to a voltage induced by a rotor of the electrically commutated machine is set as precommutation angle of the electrically commutated machine depending on a rotational speed of the electrically commutated machine.

SUMMARY OF THE INVENTION

The invention is based on a method for operating an electrically commutated machine.

It is proposed that in at least one method step, in particular in at least one method step of overmodulation operation of the electrically commutated machine, a precommutation angle of the electrically commutated machine is set depending on an efficiency of the electrically commutated machine. The method comprises at least one motor operating mode. In particular, the electrically commutated machine, in particular in the motor operating mode, is provided for converting electrical energy into mechanical energy. Alternatively or additionally, the method comprises a generator operating mode. In particular, the electrically commutated machine, in particular in the generator operating mode, is provided for converting mechanical energy into electrical energy. "Provided" should be understood to mean, in particular, specifically configured, specifically programmed, specifically designed and/or specifically equipped. The fact that an object is provided for a specific function should be understood to mean, in particular, that the object fulfills and/or performs said specific function in at least one application and/or operating state. The electrically commutated machine comprises at least one stator. In at least one method step, in particular by means of the stator, a magnetic field is generated. The magnetic field is generated by at least one inductive component of the stator. The method comprises, in at least one method step, electrically commutating a current flow for generating the magnetic field through the stator, in particular through the inductive component. Electrically commutating involves cyclically changing a direction of the current flow for generating the magnetic field. It is also conceivable that, in particular additionally, an amplitude of the current flow is changed. By way of example, a signal waveform of the current flow can be at least one substantially rectangular, trapezoidal, triangular, sinusoidal or the like. Electrically commutating involves switching the current flow back and forth between at least two, or at least three, inductive components.

The electrically commutated machine comprises at least one rotor. The rotor has a magnetic moment in at least one method step, particularly permanently. By way of example, the magnetic moment is generated by means of a permanent magnet. However, it is also conceivable for the magnetic moment to be generated by means of an electromagnet. In at least one method step, in particular as a result of a coupling of the magnetic field to the magnetic moment, the rotor is driven to effect a movement, in particular a rotational movement. The rotor is provided for transmitting a generated torque to a working machine via at least one rotor shaft of the rotor. A rotational speed of the rotor is predefined by a rate of change of the electrical commutation, and in particular by the number of inductive components.

In at least one method step, a precommutation angle of the electrical commutation is set. In at least one method step, an orientation and/or rotational speed of the rotor are/is detected, ascertained and/or estimated, in particular by means of an open-loop or closed-loop control unit of the electrically commutated machine. In at least one method step, a direction of the magnetic field is adapted to an orientation of the rotor by the electrical commutation of the current flow. In particular, the magnetic field is rotated about a rotation axis of the rotor by the electrical commutation. The magnetic field can be rotated continuously or in discrete steps. The magnetic field leads the rotor in the direction of movement of the rotor with the precommutation angle, in particular by less than 90°. The orientation of the magnetic field is kept at least substantially phase-locked with the orientation of the rotor in at least one method step. "Substantially phase-locked" should be understood to mean, in particular, that the precommutation angle, in a stable operating state of the electrically commutated machine, fluctuates by less than 30°, preferably by less than 15°, particularly preferably by less than 5°, around an average value of the precommutation angle over time. The precommutation angle is set to different values for different operating states of the electrically commutated machine. In particular, operating states of the electrically commutated machine differ in the rotational speed of the rotor and/or in the torque that can be tapped off at the rotor, in particular the rotor shaft.

In particular by the open-loop or closed-loop control unit of the electrically commutated machine, in at least one method step, a setpoint value for the precommutation angle is chosen and/or ascertained, in particular on the basis of comparison values and/or assignment specifications stored in a storage unit of the electrically commutated machine. By the open-loop or closed-loop control unit of the electrically commutated machine, the setpoint value for the precommutation angle is chosen and/or ascertained depending on the present operating state and/or a setpoint operating state of the electrically commutated machine. By the open-loop or closed-loop control unit of the electrically commutated machine, the setpoint value for the precommutation angle is chosen and/or ascertained depending on an efficiency of the electrically commutated machine. The "efficiency" should be understood to mean a ratio of a mechanical power provided by the electrically commutated machine to an electrical power consumed by the electrically commutated machine. In particular, the efficiency is at least proportional to the torque transmitted by the rotor, in particular the rotor shaft. In particular, the efficiency is at least proportional to the rotational speed of the rotor. In particular, the efficiency is at least inversely proportional to an electrical power consumed by the electrically commutated machine, in particular to the current flow through the stator. In particular, at least in one method step of a preparation phase, a setpoint value of the precommutation angle is assigned to at least one operating state, in particular by an external computing unit. In particular, the external computing unit is provided for creating and/or processing a mathematical model of the electrically commutated machine. In some embodiments, "external" should be understood to mean embodied and/or operable independently of the electrically commutated machine. In an alternative configuration, it is also conceivable for the external computing unit and the open-loop or closed-loop control unit of the electrically commutated machine to be integrated in one another or for the open-loop or closed-loop control unit of the electrically commutated machine to assign a setpoint value of the precommutation angle to at least one operating state. In particular, at least in one method step of a preparation phase, in particular by the external computing unit, a respective setpoint value of the precommutation angle is assigned to a plurality of operating states. In particular, at least in one method step of a preparation phase, an assignment, in particular by the external computing unit, of a setpoint value of the precommutation angle to an operating state is carried out on the basis of the operating-state-dependent efficiency. By way of example, in particular by the external computing unit, an operating state is assigned a setpoint value of the precommutation angle which has the highest efficiency depending on operating state. By way of example, in particular by the external computing unit, a plurality of operating states are assigned a respective setpoint value of the precommutation angle which achieves the same efficiency for said operating states. In the external computing unit, an assignment is stored in the storage unit of the electrically commutated machine. In at least one method step, the setpoint value for the precommutation angle, said setpoint value being assigned depending on the efficiency, is retrieved, in particular by the open-loop or closed-loop control unit of the electrically commutated machine. In at least one method step, the setpoint value for the precommutation angle, said setpoint value being assigned depending on the efficiency, is evaluated for an open-loop control or closed-loop control of the precommutation angle, in particular by the open-loop or closed-loop control unit of the electrically commutated machine. The configuration of the method enables an electrically commutated machine to be operated with an advantageously settable efficiency. In particular, the electrically commutated machine can be operated efficiently in an advantageous manner. Alternatively or additionally, the electrically commutated machine, in particular by means of an efficiency that is kept constant, can be operated with an advantageously linear relationship between mechanical power and electrical power.

Furthermore, it is proposed that in at least one method step, in particular in at least one method step of overmodulation operation of the electrically commutated machine, at least one commutation signal of the electrically commutated machine is overmodulated. In particular, the commutation signal is embodied as the current flow through the stator and/or as a voltage drop across the stator corresponding to the current flow. The commutation signal is generated by a switching unit, in particular a transistor unit, of the electrically commutated machine. In at least one method step, the commutation signal is provided with a pulse width modulation, in particular by the open-loop or closed-loop control unit of the electrically commutated machine. The method comprises at least one mode of regular operation. In particular, in regular operation, a highest amplitude of the current flow is used which is less than a current limit predefined by a current supply and/or by a component of the electrically commutated machine. In particular, in regular operation, a highest amplitude of a voltage drop corresponding to the current flow is used which is less than a voltage limit predefined by a voltage supply, by a component and/or by an operating parameter of the electrically commutated machine. At least in regular operation, in particular by the open-loop or closed-loop control unit of the electrically commutated machine, the precommutation angle is set depending on the efficiency. In overmodulation operation, a setpoint value for the highest amplitude of the current flow above the current limit or a setpoint value for the highest amplitude of the voltage drop above the voltage limit is predefined. The commutation signal is cut off upon a changeover, in particular from regular operation, to overmodulation operation at the voltage limit or the current limit. In particular, in overmodulation operation, in particular by the open-loop or closed-loop control unit of the electrically commutated machine, a root-mean-square value of a voltage drop and/or of the current flow is increased relative to regular operation. By way of example, a root-mean-square value of a voltage drop that is sinusoidal in regular operation is set to a value of greater than a $1/\sqrt{2}$ proportion of the voltage limit. At least in overmodulation operation, the precommutation angle is set depending on the efficiency. As a result of the configuration according to the invention, switching losses that occur in particular on account of the pulse width modulation in regular operation can be kept advantageously low. In particular, a ripple of a current flow through a decoupling unit, in particular a link circuit capacitor unit, of the electrically commutated unit can be kept advantageously low.

Furthermore, it is proposed that in at least one method step, in particular in at least one method step of overmodulation operation of the electrically commutated machine, the precommutation angle is set on the basis of at least one continuous current characteristic curve of the electrically commutated machine. In at least one method step, in particular in at least one method step of regular operation of the electrically commutated machine, the precommutation angle is set on the basis of the continuous current characteristic curve of the electrically commutated machine. In at least one method step, in particular in at least one method step with a setpoint value for the highest amplitude of the voltage drop that lies below the voltage limit, the precommutation angle is set on the basis of the continuous current characteristic curve of the electrically commutated machine. The precommutation angle is set by way of a ratio of partial currents of the current flow, in particular by the open-loop or closed-loop control unit of the electrically commutated machine. In at least one method step, the current flow is represented in a rotor coordinate system linked with the rotor for conjoint rotation. In particular, the current flow, relative to the rotor, comprises a partial current that is representable as quadrature-axis current. In particular, the current flow, relative to the rotor, comprises a partial current that is representable as direct-axis current. The direct-axis current is embodied such that it is at least substantially perpendicular to the quadrature-axis current. The direct-axis current is embodied such that it is at least substantially parallel to the magnetic moment. The quadrature-axis current is embodied such that it is at least substantially perpendicular to the magnetic moment. "Substantially parallel" should be understood here to mean, in particular, an orientation of a direction relative to a reference direction, in particular in a plane, wherein the direction has a deviation of, in particular, less than 8°, advantageously less than 5°, and particularly advantageously less than 2°, relative to the reference direction. The expression "substantially perpendicular" is intended here to define, in particular, an orientation of a direction relative to a reference direction, wherein the direction and the reference direction, in particular when considered in a plane, form an angle of 90° and the angle has a maximum deviation of, in particular, less than 8°, advantageously less than 5°, and particularly advantageously less than 2°. In particular by the open-loop or closed-loop control unit of the electrically commutated machine, the precommutation angle is set by way of a ratio of the direct-axis current to the quadrature-axis current. In at least one method step, a ratio of direct-axis current to quadrature-axis current that achieves a settable efficiency is ascertained for at least one operating state. In at least one method step, a respective ratio of direct-axis current to quadrature-axis current that achieves a settable efficiency is ascertained for a multiplicity of operating states. In at least one method step, the current characteristic curve is determined, in particular by means of the external computing unit, in particular at the factory. In particular, the current characteristic curve, in particular below the current limit, assigns a respective value of the quadrature-axis current and a respective value of the direct-axis current to one another. In at least one method step, the current characteristic curve is stored in the storage unit. In particular, in at least one method step, a total magnitude of the current flow and/or a magnitude of the quadrature-axis current are/is defined by the operating state, in particular by the torque to be delivered. In at least one method step, a division of the current flow between the partial currents, in particular between the quadrature-axis current and the direct-axis current, is ascertained on the basis of the current characteristic curve. The ascertained division of the current flow is used as setpoint values for a closed-loop control of the quadrature-axis current and/or a closed-loop control of the direct-axis current. As a result of the configuration according to the invention, a setpoint value for the precommutation angle can be ascertained advantageously simply. In particular, the precommutation angle can be set advantageously in an operating-state-dependent manner. In particular, for an operating state, it is possible to set a precommutation angle with a defined efficiency.

Furthermore, it is proposed that at least one method step involves ascertaining at least one current characteristic curve of the electrically commutated machine for setting the precommutation angle at at least one operating temperature of the electrically commutated machine, in particular by means of the external computing unit. Exactly one current characteristic curve is ascertained in one embodiment. However, it is also conceivable for a set of current characteristic curves and/or a family of current characteristic curves to be ascertained, in particular with an operating parameter of the electrically commutated machine as a degree of freedom. The at least one current characteristic curve is ascertained, in particular calculated and/or simulated, on the basis of machine parameters of the electrically commutated machine. A "machine parameter" should be understood to mean, in particular, a variable or characteristic figure resulting from the construction and/or the used components of the electrically commutated machine. A machine parameter varies by less than 200%, preferably by less than 100%, particularly preferably by less than 50%, in different operating states. It is conceivable, in particular, for a value of the machine parameter to vary depending on a temperature of the electrically commutated machine. By way of example, the machine parameter is embodied as an inductance of the inductive component. By way of example, the machine parameter is embodied as an electrical resistance of the inductive component. By way of example, the machine parameter is embodied as a flux linkage achievable with the inductive component, in particular as a flux linkage per unit of the current flow. By way of example, the machine parameter is embodied as a strength of the magnetic moment. By way of example, the machine parameter is embodied as a reluctance moment. The current characteristic curve is ascertained with a value of the machine parameter which arises at the operating temperature of the electrically commutated machine. In particular, at least one method step involves detecting the machine parameter at the operating temperature and/or applying a temperature-dependent correction value to said machine parameter. The operating temperature results from inherent heating on account of the operation of the electrically commutated machine and/or from an ambient temperature known per se of a provided location of use of the electrically commutated machine, for example a vehicle motor compartment. It is conceivable to detect further characteristic curves for further temperature values of the electrically commutated machine. It is also conceivable, when ascertaining the current characteristic curve, to take account of an influence of at least one further operating parameter, for example an influence of operation at a nominal rotational speed of the electrically commutated machine, on the current characteristic curve. By virtue of the configuration according to the invention, the current characteristic curve can be advantageously accurately coordinated with operation of the electrically commutated machine.

Furthermore, it is proposed that in at least one method step, in particular in at least one method step of overmodulation operation of the electrically commutated machine, the precommutation angle is set to a value which achieves a highest efficiency for a given operating state. In particular by the open-loop or closed-loop control unit, an operating state is predefined, in particular on the basis of a rotational speed closed-loop control and/or torque closed-loop control. For the given operating state, a precommutation angle, in particular a ratio of the partial currents of the current flow, is retrieved from the storage unit. In at least one method step, in particular by the open-loop or closed-loop control unit of the electrically commutated machine, a value for the precommutation angle is ascertained which achieves a highest value for the efficiency for the given operating state. In particular, for at least one further operating state, at least one further value for the precommutation angle is ascertained which achieves a further highest value for the efficiency for the further operating state. It is conceivable for the highest value for the efficiency for the operating state and the further highest value for the efficiency for the further operating state to deviate from one another. In at least one method step, for the given operating state, a value of the precommutation angle is ascertained which achieves a greatest torque per magnitude of the current flow. The current characteristic curve consists of points which achieve in each case the greatest torque per magnitude of the current flow for different operating states. By virtue of the configuration according to the invention, the electrically commutated machine can be operated advantageously efficiently. In particular, a power loss can be kept advantageously low. In particular, heating of the commutated machine on account of the power loss can be kept advantageously low. In particular, an advantageously high electromagnetic compatibility, restricted in particular by the power loss, of the electrically commutated machine can be achieved.

Furthermore, it is proposed that in at least one method step, in particular in a method step of field weakening operation of the electrically commutated machine, efficiency-dependent setting of the precommutation angle is deactivated. In at least one method step, in particular in at least one method step of field weakening operation of the electrically commutated machine, the precommutation angle, in particular for achieving a stable operating point of the electrically commutated machine under load, is set in a manner deviating from the continuous current characteristic curve. In particular, the precommutation angle, in particular for achieving a stable operating point of the electrically commutated machine under load, is set in a manner deviating from the continuous current characteristic curve in the case where the setpoint value for the highest amplitude of the voltage drop exceeds the voltage limit. In particular, in field weakening operation, the open-loop or closed-loop control unit of the electrically commutated machine sets a direct-axis current of higher magnitude than is predefined by the current characteristic curve. The direct-axis current is predefined by an open-loop control or closed-loop control of the rotational speed of the rotor in field weakening operation. In particular, the direct-axis current is controlled by open-loop or closed-loop control independently of the quadrature-axis current in field weakening operation. In field weakening operation, in particular by the open-loop or closed-loop control unit, the precommutation angle is set which achieves the highest torque and/or the highest efficiency whilst complying with the voltage limit. The commutation signal of the electrically commutated machine is overmodulated in field weakening operation. In at least one method step, the efficiency-dependent setting of the precommutation angle is activated when field weakening operation ceases. By virtue of the configuration according to the invention, advantageously flexible operation of the electrically commutated machine can be achieved. In particular, an advantageously high rotational speed range can be covered by the electrically commutated machine.

Furthermore, it is proposed that at least one method step involves determining a starting point of a deviation from a current characteristic curve of the electrically commutated machine for setting the precommutation angle depending on at least one operating parameter of the electrically commutated machine. In particular, in at least one method step, a point of intersection of the, in particular operating-parameter-dependent, voltage limit with the current characteristic curve is chosen as the starting point. In at least one method step, the voltage limit is ascertained. The voltage limit is ascertained depending on at least one operating parameter. The voltage limit is ascertained depending on the rotational speed. The voltage limit, in particular for a given rotational speed, is ascertained depending on the operating temperature. For ascertaining the voltage limit, the current flow, in particular a difference between the current flow and a setpoint value, is detected. By virtue of the configuration according to the invention, it is possible advantageously to realize an alternative range in the case of a falling voltage limit. In particular, the electrically commutated machine can be operated advantageously continuously despite a falling voltage limit, for example on account of an increasing operating temperature.

Furthermore, it is proposed that the method comprises at least one compensation step for adapting the precommutation angle to an ambient parameter. In at least one method step, an ambient parameter is detected, in particular by means of an ambient sensor element of the electrically commutated machine, and/or is ascertained, in particular on the basis of ambient-parameter-dependent operating parameters by means of the open-loop or closed-loop control unit. Alternatively or additionally, the electrically commutated machine comprises at least one input element, in particular for manual input, passive reception and/or active interrogation of the ambient parameter from an external source. By way of example, the ambient parameter is embodied as ambient temperature, as ambient pressure, in particular air pressure, and/or as voltage supply that can be supplied by an external current and/or voltage source. In the compensation step, a maximum amplitude of the commutation signal is adapted to the supply voltage that can be supplied. In particular, in the compensation step, a maximum setpoint value of the highest amplitude of the voltage drop, in particular for an overmodulation of the commutation signal, is adapted to the supply voltage that can be supplied. In particular, the starting point for the deviation from the current characteristic curve is shifted by means of the adaptation to the supply voltage that can be supplied. By way of example, in the compensation step, one of a plurality of current characteristic curves is selected on the basis of an ambient temperature. Alternatively or additionally, a temperature-dependent correction factor is applied to the current characteristic curve. By virtue of the configuration according to the invention, the electrically commutated machine can be operated, in particular efficiently, with an advantageously large bandwidth of the ambient parameters. In particular, a complete stoppage of operation of the electrically commutated machine on account of ambient parameters outside a provided value range for the electrically commutated machine can be avoided for an advantageously long time.

Furthermore, an electrically commutated machine comprising at least one open-loop or closed-loop control unit for carrying out a method according to the invention is proposed. The electrically commutated machine comprises at least one stator. The stator comprises at least one inductive component. The inductive component is embodied as a wire winding around a structural element of the stator. However, it is also conceivable for the inductive component to be arranged as an independent coil element at the stator. The stator comprises three and/or a multiple of three inductive components. However, a different number of inductive components, in particular two or one, is also conceivable. At least two, and preferably all, inductive components comprise at least one common potential step, in particular a common ground. The inductive components are arranged at regular distances, in particular in a circular fashion, at the stator. The electrically commutated machine comprises at least one switching unit, in particular a transistor unit, for switching the at least one inductive component, in particular for switching between different inductive components. The switching unit is provided, in particular additionally, for amplifying a commutation signal for the at least one inductive component. The switching unit is embodied as a bridge circuit and/or a half-bridge circuit, in particular as a B6 bridge and/or as a 2H bridge. The open-loop or closed-loop control unit is provided for controlling the switching unit, in particular for generating a commutation signal. The open-loop or closed-loop control unit is provided for applying a pulse width modulation to the commutation signal. The electrically commutated machine comprises at least the one connection unit for a current supply and/or voltage supply of the electrically commutated machine. It is also conceivable for the electrically commutated machine to comprise a current and/or voltage source, in particular a battery unit. The electrically commutated machine comprises at least one decoupling unit, in particular a link circuit capacitor unit, between the connection unit, in particular the current and/or voltage source, and the switching unit. The electrically commutated machine comprises at least one rotor. The rotor is arranged at the stator. The rotor is embodied as an external rotor, an internal rotor or a disk-type rotor. The rotor comprises at least one magnet element for generating a magnetic moment. The magnet element is embodied as a permanent magnet element. However, it is also conceivable for the magnet element to be embodied as an electromagnet. It is conceivable for the rotor to have a plurality of magnet elements, in particular arranged rotationally symmetrically. The rotor comprises at least one rotor shaft, for transmitting a torque to a working machine. The electrically commutated machine is embodied in a brushless fashion. The electrically commutated machine comprises at least one housing unit and/or one shielding unit, in particular for protecting the rotor and/or electronic components of the electrically commutated machine. The electrically commutated machine comprises at least one storage unit for storing the current characteristic curve. It is conceivable for the storage unit to be integrated into the open-loop or closed-loop control unit. An electrically commutated machine having an advantageously defined and/or settable efficiency can be made available by virtue of the configuration.

Furthermore, a cooling device for circulating a cooling fluid, in particular for cooling a vehicle motor, comprising at least one conveying element for conveying the cooling fluid, in particular air, and comprising at least one electrically commutated machine according to the invention for driving the conveying element is proposed. The cooling device is provided for the cooling of a space and/or of an object, in particular of a heat-generating machine, preferably of a motor. The conveying element is embodied as a fan element, as a propeller element, as a compressor element, as a pump element or the like. In particular, the conveying element has a load moment that rises monotonically, in particular quadratically, with the rotational speed of the conveying element. The conveying element is connected to the rotor shaft of the rotor of the electrically commutated machine directly, in particular for conjoint rotation, or indirectly via a gearing unit. The cooling device has at least one stable operating point in overmodulation operation. In particular, the cooling device has at least one stable operating point in overmodulation operation at a standard pressure, at a standard temperature, at a standard voltage supply and/or at a standard rotational speed. The standard pressure is embodied as pressure of the cooling fluid, in particular as atmospheric air pressure, within a value range around 1013 mbar, wherein an interval width comprises at least 100 mbar, preferably at least 300 mbar, particularly preferably at least 500 mbar. The standard temperature is embodied as an operating temperature of the electrically commutated machine, in particular during operation within a motor compartment, within a value range around 110° C., wherein an interval width comprises at least 10 K, preferably at least 20 K, particularly preferably at least 30 K. A standard rotational speed is embodied as a rotational speed of the rotor within a value range around the nominal rotational speed, wherein an interval width comprises at least 1%, preferably at least 5%, particularly preferably at least 10%, of the nominal rotational speed. A standard supply voltage is embodied as a supply voltage of an on-board power supply unit within a value range around 13 V, wherein an interval width comprises at least 1 V, preferably at least 3 V, particularly preferably at least 5 V. A cooling device having an advantageously defined and/or settable efficiency can be made available by virtue of the configuration. In particular, a cooling device which operates, in particular under standard conditions, in overmodulation operation can be made available. In particular, a cooling device can be made available which can react to a deviation from standard conditions advantageously flexibly as a result of a change to regular operation and/or field weakening operation.

The method according to the invention, the electrically commutated machine according to the invention and/or the cooling device according to the invention are/is intended not to be restricted here to the application and embodiment described above. In particular, the method according to the invention, the electrically commutated machine according to the invention and/or the cooling device according to the invention, for fulfilling a functioning described herein, can have a number of individual elements, components and units and method steps that deviates from a number mentioned herein. Moreover, in the case of the value ranges indicated in this disclosure, the intention is for values lying within the stated limits also to be deemed to be disclosed and to be usable in any desired way.

BRIEF DESCRIPTION OF THE DRAWINGS

Further advantages will become apparent from the following description of the drawing. The drawing illustrates one exemplary embodiment of the invention. The drawing, the description and the claims contain numerous features in combination. The person skilled in the art will expediently also consider the features individually and combine them to form advantageous further combinations.

In the figures.

DETAILED DESCRIPTION

Figure 1:
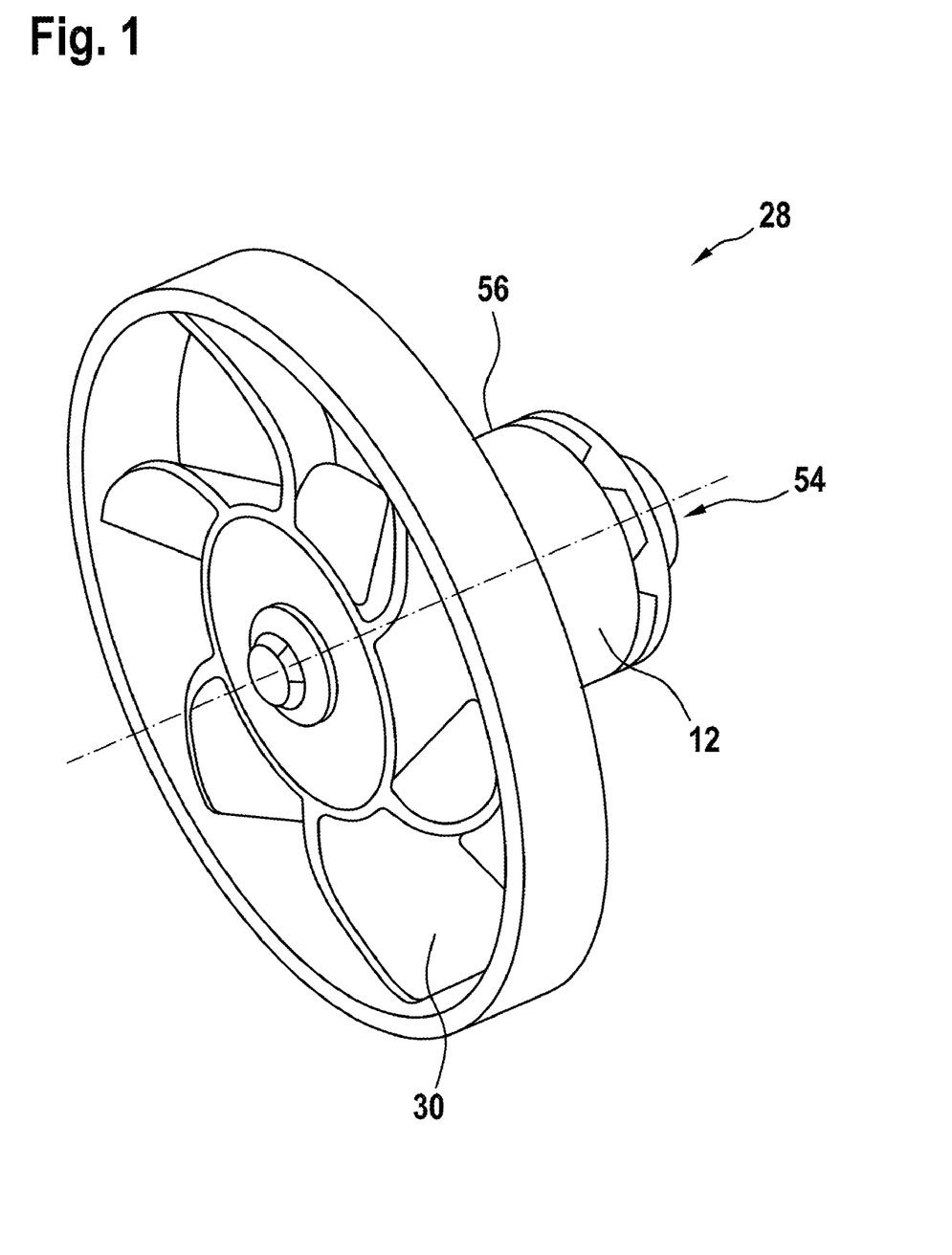
FIG. 1 shows a schematic illustration of a cooling device according to the invention.

FIG. 1 shows a cooling device 28. The cooling device 28 is provided for circulating a cooling fluid, in particular for cooling a vehicle motor. The cooling device 28 comprises at least one conveying element 30. The conveying element 30 is provided for conveying the cooling fluid, in particular air. The cooling device 28 comprises at least one electrically commutated machine 12. The electrically commutated machine 12 is provided for driving the conveying element 30. The conveying element 30 is embodied as a fan element. It is conceivable for the cooling device 28 to have a holding unit for mounting at a location of use, in particular in a vehicle motor compartment.

Figure 2:
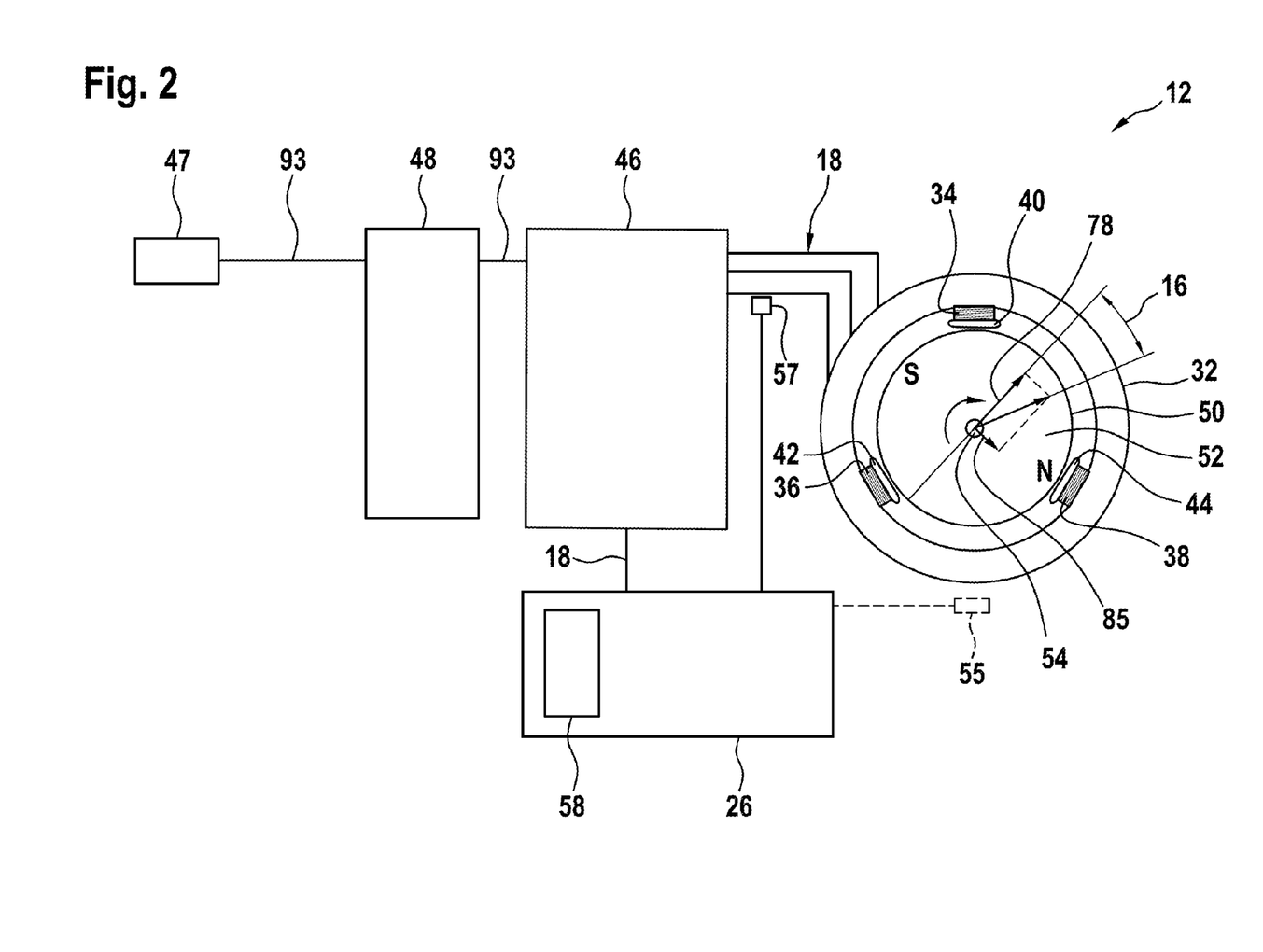
FIG. 2 shows a schematic illustration of the electrically commutated machine according to the invention.

FIG. 2 shows the electrically commutated machine 12. The electrically commutated machine 12 comprises at least one open-loop or closed-loop control unit 26. The open-loop or closed-loop control unit 26 is provided for carrying out a method 10 (see FIG. 3). The electrically commutated machine 12 comprises at least one stator 32. The stator 32 comprises at least one inductive component 34, 36, 38. The inductive component 34, 36, 38 is embodied as a wire winding around a structural element 40, 42, 44 of the stator 32. The stator 32 comprises three inductive components 34, 36, 38. At least two or more inductive components 34, 36, 38 comprise at least one common potential step, in particular a common ground. The inductive components 34, 36, 38 are arranged at regular distances, in particular in a circular fashion, at the stator 32.

The electrically commutated machine 12 comprises at least one switching unit 46, in particular a transistor unit, for switching the at least one inductive component 34, 36, 38. The switching unit 46 is provided, in particular additionally, for amplifying a commutation signal 18 for the at least one inductive component 34, 36, 38. The switching unit 46 is embodied as a bridge circuit and/or a half-bridge circuit, in particular as a B6 bridge and/or as a 2H bridge. The open-loop or closed-loop control unit 26 is provided for controlling the switching unit 46, in particular for generating the commutation signal 18. The open-loop or closed-loop control unit 26 is provided for applying a pulse width modulation to the commutation signal 18. The electrically commutated machine 12 comprises at least one connection unit 47 for a current supply and/or voltage supply of the electrically commutated machine 12. The electrically commutated machine 12 comprises at least one decoupling unit 48, in particular a link circuit capacitor unit, between the connection unit 47 and the switching unit 46.

The electrically commutated machine 12 comprises at least the one rotor 50. The rotor 50 is arranged at the stator 32. The rotor 50 is embodied as an internal rotor. The rotor 50 comprises at least one magnet element 52 for generating a magnetic moment. The magnet element 52 is embodied as a permanent magnet element. The rotor 50 comprises at least one rotor shaft 54 for transmitting a torque 53 to the conveying element 30. The electrically commutated machine 12 is embodied in a brushless fashion. The electrically commutated machine 12 comprises at least one housing unit 56, in particular for protecting the rotor 50 and/or electronic components of the electrically commutated machine 12 (cf. FIG. 1). The electrically commutated machine 12 comprises at least one storage unit 58 for storing a current characteristic curve 20 (cf. FIG. 4). The electrically commutated machine 12 comprises at least one sensor element 57 for detecting the, in particular amplified and/or modulated, commutation signal 18. It is also conceivable for the electrically commutated machine 12 to comprise at least one position sensor 55 for detecting a present position and/or speed of the rotor 50.

Figure 3:
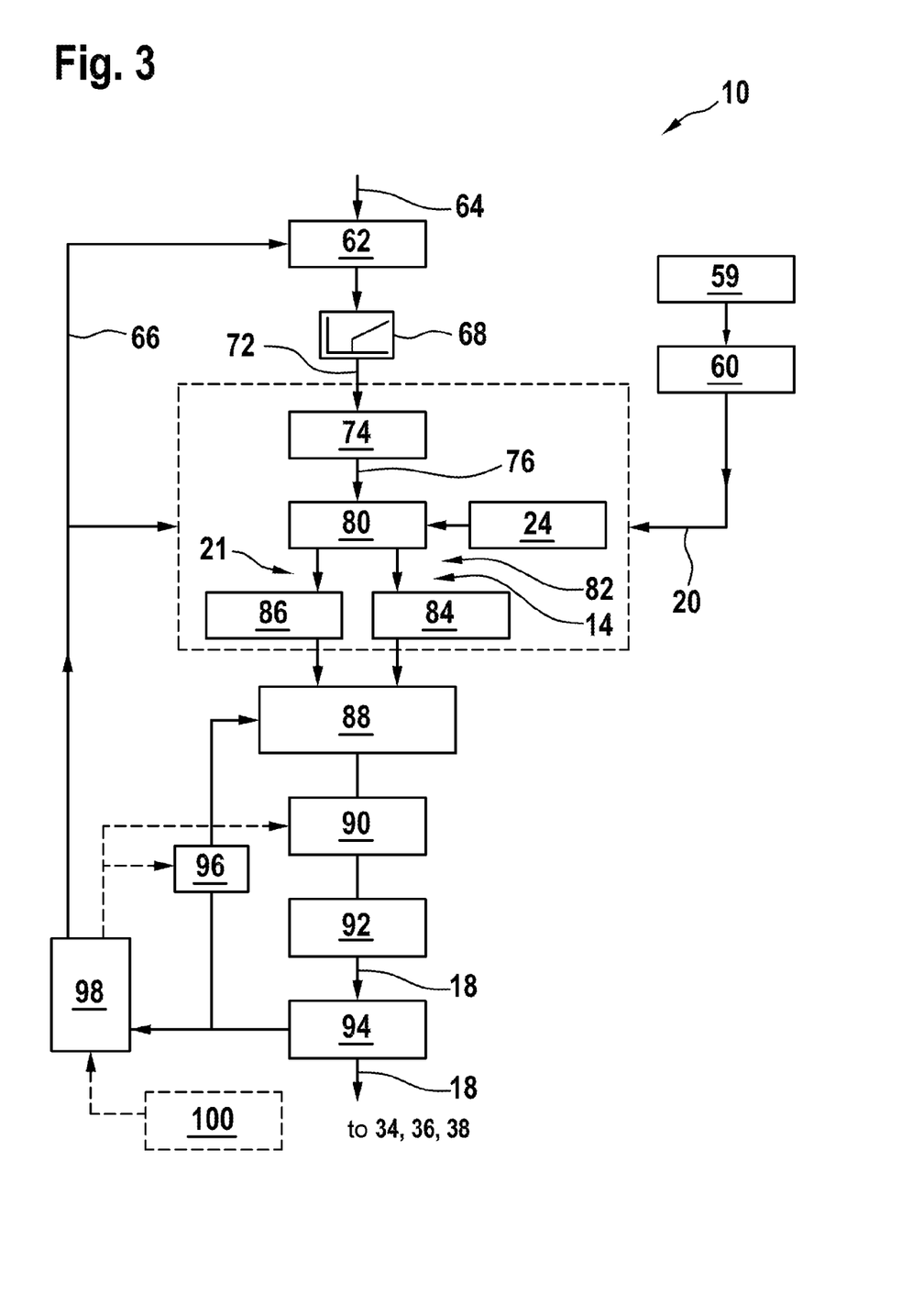
FIG. 3 shows a flow diagram of a method according to the invention in a schematic illustration.
Figure 5:
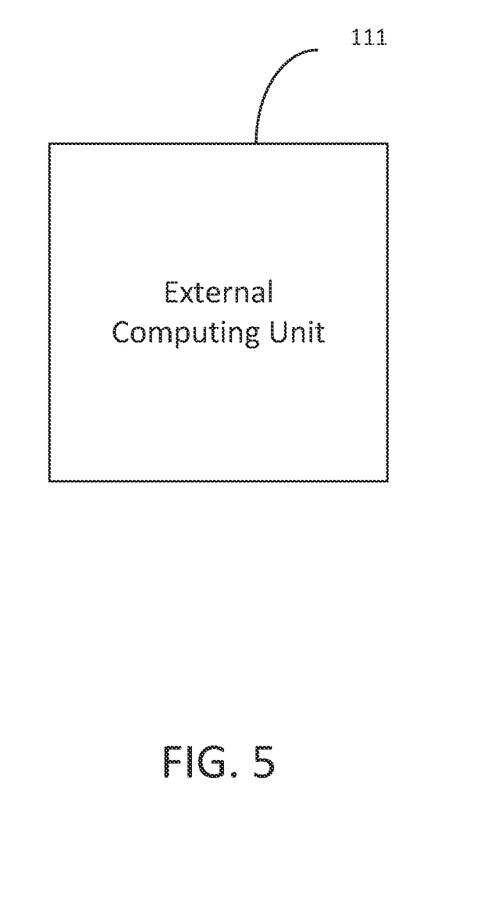
FIG. 5 shows a block diagram of an external computing unit.

FIG. 3 shows the method 10. The method 10 is provided for operating the electrically commutated machine 12. In at least one method step, in particular in at least one method step of overmodulation operation 14 of the electrically commutated machine 12, a precommutation angle 16 of the electrically commutated machine 12 is set depending on an efficiency of the electrically commutated machine 12. In particular, in at least one modeling step 59, in particular during a preparation phase of the method 10, a mathematical model of the electrically commutated machine 12 is created, in particular by means of an external competing unit. In particular, in the modeling step 59, in particular during the preparation phase of the method 10, at least one machine parameter is detected and/or ascertained. The machine parameters are detected, in particular during the preparation phase of the method 10, at an operating temperature of the electrically commutated machine 12, in particular at a typical ambient temperature of a location of use of the electrically commutated machine 12. Alternatively or additionally, when ascertaining the at least one machine parameter, a temperature-dependent correction value is applied to the at least one machine parameter. In a characteristic curve ascertaining step 60, in particular during a preparation phase of the method 10, the current characteristic curve 20 is ascertained with the aid of the mathematical model of the electrically commutated machine 12, in particular by means of the external computing unit 111 shown in FIG. 5. In the characteristic curve ascertaining step 60, in particular during the preparation phase of the method 10, this involves ascertaining at least the current characteristic curve 20 of the electrically commutated machine 12 for setting the precommutation angle 16 at at least one operating temperature of the electrically commutated machine 12. In particular, in the characteristic curve ascertaining step 60, in particular during the preparation phase of the method 10, the current characteristic curve 20 is stored in the storage unit 58. It is also conceivable for the model of the electrically commutated machine 12 to be stored in the storage unit 58. The current characteristic curve 20 is stored in the storage unit 58 in the course of mounting of the electrically commutated machine 12 and/or in the course of installation of the electrically commutated machine 12, in particular of the cooling device 28. It is also conceivable for the current characteristic curve 20 to be updated for example in the course of maintenance work, in particular in an installed state of the electrically commutated machine 12, in particular of the cooling device 28.

A setpoint rotational speed 64 is predefined for a rotational speed closed-loop control 62 of the method 10. By way of example, the setpoint rotational speed 64 is predefined by a user and/or received and/or interrogated from an external source. In a rotational speed processing step 68, a deviation from an actual rotational speed 66 is processed, for example by means of a PI control element of the open-loop or closed-loop control units 26, to form a setpoint torque 72. In particular by the open-loop or closed-loop control unit 26, in a torque processing step 74, a current setpoint value 76 for a partial current flow—embodied as quadrature-axis current 78—of a total current flow through the stator 32 and/or for the magnitude of the total current flow through the stator 32 is ascertained from the setpoint torque 72. In particular, a maximum current 77 that is maximally achievable is predefined by means of an, in particular operating-parameter-dependent, voltage limit. In particular by the open-loop or closed-loop control unit 26, in an operation ascertaining step 80, the current setpoint value 76 is compared with the maximum current 77. In particular, a point of intersection of the maximum current 77 with the current characteristic curve 20 marks a starting point 22 of a deviation from the current characteristic curve 20 for setting the precommutation angle 16. The operation ascertaining step 80 involves determining the starting point 22 (cf. FIG. 4) of a deviation from the current characteristic curve 20 of the electrically commutated machine 12 for setting the precommutation angle 16 depending on at least one operating parameter of the electrically commutated machine 12. In particular, the starting point 22 is determined depending on the rotational speed, in particular by the open-loop or closed-loop control unit 26. In particular, the starting point 22 is determined depending on the operating temperature, in particular by the open-loop or closed-loop control unit 26. The method 10 comprises at least one compensation step 24 for adapting the precommutation angle 16 to an ambient parameter. In the compensation step 24, the ambient parameter is detected and/or interrogated and/or received from an external source. In particular, in the compensation step 24, a correction value for the starting point 22 is ascertained, in particular by the open-loop or closed-loop control unit 26. In particular, the correction value is ascertained, by the open-loop or closed-loop control unit 26, depending on an ambient parameter embodied as a supply voltage 93.

In the operation ascertaining step 80, in particular by the open-loop or closed-loop control unit 26, regular operation 82 is activated in the case where the current setpoint value 76 undershoots the maximum current 77. In the operation ascertaining step 80, in particular by the open-loop or closed-loop control unit 26, overmodulation operation 14 is activated in the case where the current setpoint value 76 exceeds the maximum current 77 by less than a modulation tolerance value. The modulation tolerance value for the current setpoint value is more than 1.5%, preferably more than 3%, particularly preferably more than 4.5%, of the maximum current 77. The modulation tolerance value for the current setpoint value is less than 10%, preferably less than 8.5%, particularly preferably less than 6.5%, of the maximum current 77. In particular by the open-loop or closed-loop control unit 26, in a direct-axis current ascertaining step 84, in particular in regular operation 82 and/or in overmodulation operation 14, a setpoint value for a partial current flow—embodied as direct-axis current 85—of the total current flow is ascertained on the basis of the current characteristic curve 20. In the direct-axis current ascertaining step 84, the precommutation angle 16 is set on the basis of at least the continuous current characteristic curve 20 of the electrically commutated machine 12. In particular, in the direct-axis current ascertaining step 84, a setpoint value for the direct-axis current 85 is ascertained depending on the current setpoint value 76, in particular by the open-loop or closed-loop control unit 26. In the direct-axis current ascertaining step 84, the precommutation angle 16 is set to a value that achieves a highest efficiency for a given operating state. In particular by the open-loop or closed-loop control unit 26, in overmodulation operation 14 of the electrically commutated machine 12, the current setpoint value 76 is chosen to be higher than the maximum current 77, in particular for an overmodulation of the commutation signal 18, in particular for increasing a root-mean-square value of the current flow through the stator 32.

In the operation ascertaining step 80, in particular by the open-loop or closed-loop control unit 26, field weakening operation 21 is activated in the case where the current setpoint value 76 exceeds the maximum current 77, in particular by more than the modulation tolerance value for the current setpoint value. In a direct-axis current adapting step 86 of field weakening operation 21, efficiency-dependent setting of the precommutation angle 16 is deactivated. In particular by the open-loop or closed-loop control unit 26, in the direct-axis current adapting step 86 in field weakening operation 21, the setpoint value for the partial current flow—embodied as direct-axis current 85—of the total current flow is increased and/or reduced depending on the setpoint torque 72.

The setpoint value for the direct-axis current 85 and the setpoint value for the quadrature-axis current 78 are transferred to a current closed-loop control 88. In a transformation step 90, the setpoint values for the direct-axis current 85 and the quadrature-axis current 78 are translated into setpoint values for partial currents—embodied as phase currents—of the total current flow through the individual inductive components 34, 36, 38, in particular with the inclusion of a present position of the rotor 50. In a converter step 92, in particular by means of the open-loop or closed-loop control unit 26, on the basis of the setpoint values for the partial currents—embodied as phase currents—of the total current flow through the individual inductive components 34, 36, 38, at least the commutation signal 18 is output. In the converter step 92, a pulse width modulation is applied to the commutation signal 18, in particular by the open-loop or closed-loop control unit 26. In the converter step 92, in overmodulation operation 14 of the electrically commutated machine 12, at least the commutation signal 18 of the electrically commutated machine 12 is overmodulated. In particular, the switching unit 46 is overdriven by the commutation signal 18 in overmodulation operation 14. In particular, the extrema of the, in particular amplified and/or modulated, commutation signal 18 are cut off by the switching unit 46 in overmodulation operation 14. In particular, in overmodulation operation 14, a time duration during which the amplified and/or modulated commutation signal 18 assumes an extremal value is increased relative to a corresponding time duration in regular operation 82.

A particular modulated, commutation signal 18 is amplified by means of the switching unit 46 and the supply voltage 93. In particular, the inductive components 34, 36, 38 are driven by the, in particular amplified and/or modulated, commutation signal 18. A current detecting step 94 involves detecting the, in particular amplified and/or modulated, commutation signal 18, in particular as phase currents. The detected, in particular amplified and/or modulated, commutation signal 18, in particular in the form of phase currents, is fed back to the current closed-loop control 88. In particular, the detected, in particular amplified and/or modulated, commutation signal 18, in particular in the form of phase currents, in an inverse transformation step 96 before the current closed-loop control 88, is converted into a value for the quadrature-axis current 78 and the direct-axis current 85, in particular with the inclusion of a present position of the rotor 50. A position ascertaining step 98 involves ascertaining a present position and/or a present speed, in particular the rotational speed of the rotor 50. It is conceivable for a position- and/or speed-dependent characteristic variable to be detected, in particular by means of the position sensor 55, in at least one position detecting step 100. A signal induced in the inductive components 34, 36, 38 is evaluated for the position ascertaining step 98. In particular, the induced signal is detected together with the, in particular amplified and/or modulated, commutation signal 18, in particular by means of the sensor element 57.

Figure 4:
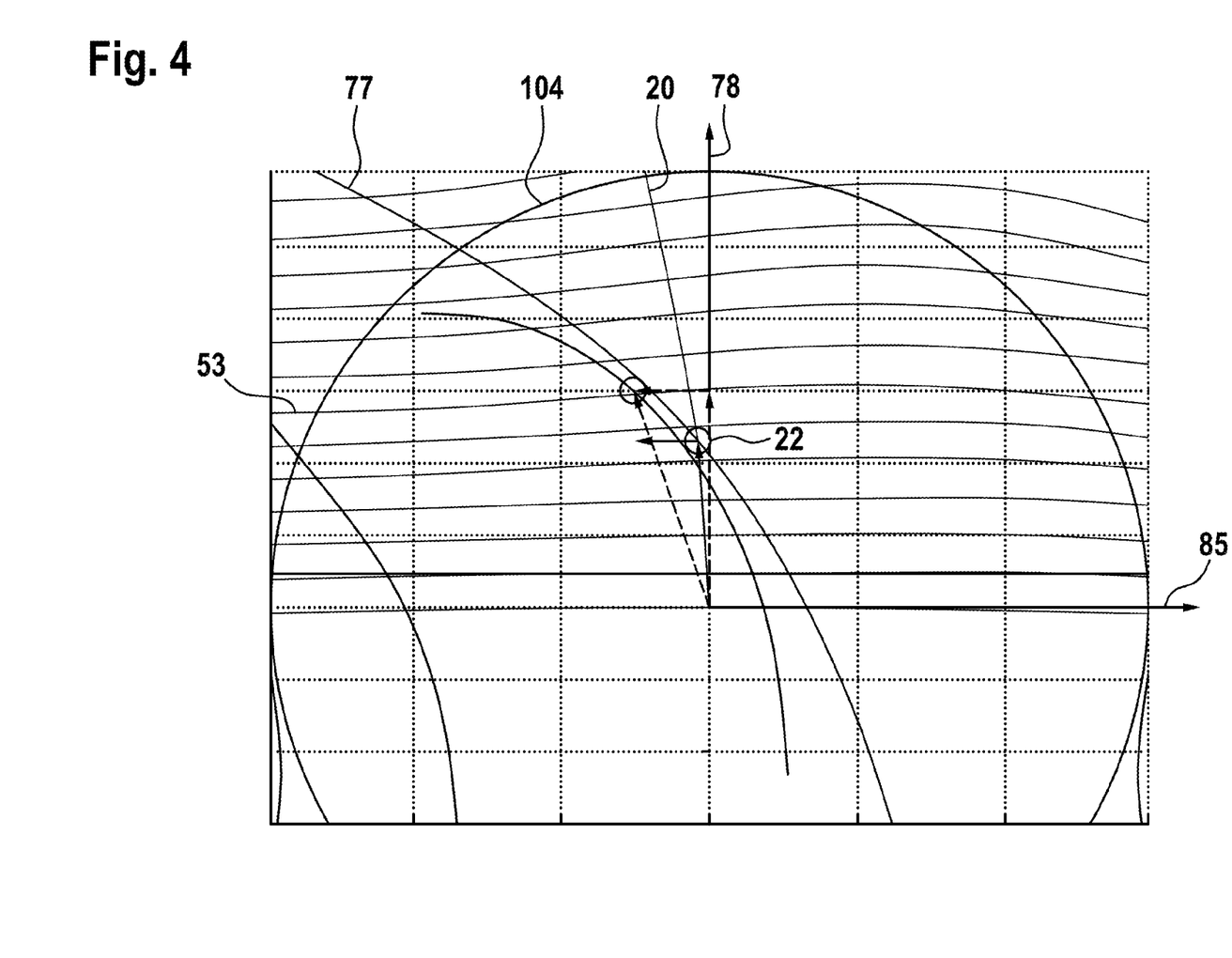
FIG. 4 shows a current characteristic curve of the method according to the invention.

FIG. 4 shows a current diagram 102. In the current diagram 102, the quadrature-axis current 78 is plotted against the direct-axis current 85. Lines of constant torque 53 are plotted in the current diagram 102. A current limit 104 is plotted in the current diagram 102. The maximum current 77 for at least one operating state is plotted in the current diagram 102. The current characteristic curve 20 describes a relation between the direct-axis current 85 and the quadrature-axis current 78. The current characteristic curve 20 assigns a direct-axis current 85 to each quadrature-axis current 78. The current characteristic curve 20 assigns a direct-axis current 85 to each quadrature-axis current 78 with a defined efficiency. In the characteristic curve ascertaining step 60, for each quadrature-axis current 78, predefined in particular by an operating state, that direct-axis current 85 which together with the quadrature-axis current 78 achieves the highest efficiency is ascertained. The current characteristic curve 20 is limited at least by the current limit 104. The current limit 104 is provided by a current supply and/or a current limiting element, in particular a fuse element, of the electrically commutated machine 12. The current characteristic curve 20 is limited by the maximum current 77 during operation of the electrically commutated machine 12. The maximum current 77 is limited by a voltage supply and/or a voltage limiting element, in particular a fuse element, of the electrically commutated machine 12. In particular, the maximum current 77 is limited by an, in particular rotational-speed-dependent, induced signal. In particular, the maximum current 77 is limited by an impedance, in particular a temperature-dependent electrical resistance, of the stator 32. The point of intersection of the maximum current 77 with the current characteristic curve 20 predefines the starting point 22. In particular, the starting point 22 marks a transition from regular operation 82 and/or overmodulation operation 14 to field weakening operation 21.

The invention claimed is:

1. A method for operating an electrically commutated machine, the method comprising, in at least one method step, setting a precommutation angle (16) of the electrically commutated machine on the basis of at least one continuous current characteristic curve (20) for efficiency of the electrically commutated machine, wherein at least one commutation signal (18) of the electrically commutated machine is overmodulated, and wherein in at least one method step of field weakening operation (21) of the electrically commutated machine, setting of the precommutation angle (16) is deactivated.

2. The method according to claim 1, wherein the at least one continuous current characteristic curve (20) of the electrically commutated machine is determined by an external computing unit and stored in a storage unit before use of the electrically commutated machine.

3. The method according to claim 1, characterized in that at least one method step involves ascertaining the at least one current characteristic curve (20) of the electrically commutated machine for setting the precommutation angle (16) at at least one operating temperature of the electrically commutated machine.

4. The method according to claim 1, characterized in that at least one method step involves determining a starting point (22) of a deviation from the current characteristic curve (20) of the electrically commutated machine for setting the precommutation angle (16) depending on at least one operating parameter of the electrically commutated machine.

5. The method according to claim 1, further comprising at least one compensation step (24) for adapting the precommutation angle (16) to an ambient parameter.

6. An electrically commutated machine comprising at least one open-loop or closed-loop control unit (26) for carrying out the method according to claim 1.

7. A cooling device for circulating a cooling fluid, comprising at least one conveying element (30) for conveying the cooling fluid, and the electrically commutated machine according to claim 6 for driving the conveying element.

8. A method for operating an electrically commutated machine, the method comprising, in at least one method step of overmodulation operation (14) of the electrically commutated machine, setting a precommutation angle (16) of the electrically commutated machine on the basis of at least one continuous current characteristic curve (20) for efficiency of the electrically commutated machine, characterized in that in at least one method step of field weakening operation (21) of the electrically commutated machine, setting of the precommutation angle (16) is deactivated.

9. The method according to claim 8, characterized in that in at least one method step of overmodulation operation (14) of the electrically commutated machine, at least one commutation signal (18) of the electrically commutated machine is overmodulated.

10. The method according to claim 8, wherein the at least one continuous current characteristic curve (20) of the electrically commutated machine is determined by an external computing unit and stored in a storage unit before use of the electrically commutated machine.

11. The method according to claim 8, characterized in that at least one method step involves ascertaining the at least one current characteristic curve (20) of the electrically commutated machine for setting the precommutation angle (16) at at least one operating temperature of the electrically commutated machine.

12. The method according to claim 8, characterized in that at least one method step involves determining a starting point (22) of a deviation from the current characteristic curve (20) of the electrically commutated machine for setting the precommutation angle (16) depending on at least one operating parameter of the electrically commutated machine.

13. The method according to claim 8, further comprising at least one compensation step (24) for adapting the precommutation angle (16) to an ambient parameter.

14. An electrically commutated machine comprising at least one open-loop or closed-loop control unit (26) for carrying out the method according to claim 8.

15. A cooling device for circulating air for cooling a vehicle motor, comprising at least one conveying element (30) for conveying the air, and the electrically commutated machine according to claim 14 for driving the conveying element.

* * * * *